United States Patent
Paananen et al.

(10) Patent No.: US 11,827,404 B2
(45) Date of Patent: Nov. 28, 2023

(54) GRIPPING DEVICE FOR GRIPPING A BINDING MATERIAL FROM AN OBJECT

(71) Applicant: CROSS WRAP OY, Siilinjärvi (FI)

(72) Inventors: Aki Paananen, Siilinjärvi (FI); Henry Blom, Kuopio (FI)

(73) Assignee: Cool Wrap Oy, Siilinjärve (FI)

( * ) Notice: Subject to any disclaimer, the term of this patent is extended or adjusted under 35 U.S.C. 154(b) by 374 days.

(21) Appl. No.: 16/644,655

(22) PCT Filed: Sep. 4, 2018

(86) PCT No.: PCT/FI2018/050623
§ 371 (c)(1),
(2) Date: Mar. 5, 2020

(87) PCT Pub. No.: WO2019/048734
PCT Pub. Date: Mar. 14, 2019

(65) Prior Publication Data
US 2021/0070489 A1    Mar. 11, 2021

(30) Foreign Application Priority Data
Sep. 5, 2017  (FI) ...................................... 20175790

(51) Int. Cl.
*B65B 69/00*   (2006.01)
*D01G 7/04*   (2006.01)
*B65G 47/90*   (2006.01)

(52) U.S. Cl.
CPC ...... *B65B 69/0025* (2013.01); *B65B 69/0033* (2013.01); *B65G 47/901* (2013.01); *D01G 7/04* (2013.01)

(58) Field of Classification Search
CPC ...... B26B 69/0025; D01G 7/04; B26D 7/025; B26D 7/065; B66F 9/18; Y10S 294/902; A01D 87/12; A01D 87/122; A01D 87/126
(Continued)

(56) References Cited

U.S. PATENT DOCUMENTS 3,513,522 A * 5/1970 Thomson ................ A01F 12/14
                                              83/89
4,784,564 A * 11/1988 Selesky ................ H01R 43/052
                                             294/902
(Continued)

FOREIGN PATENT DOCUMENTS

| EP | 3103321 A1 | 12/2016 |
| JP | H06239323 A | 8/1994 |
| WO | 2015097344 A1 | 7/2015 |

OTHER PUBLICATIONS

International Search Report issued in PCT/FI2018/050623 dated Dec. 19, 2018. [4 pages].

*Primary Examiner* — Gloria R Weeks
*Assistant Examiner* — Mobeen Ahmed
(74) *Attorney, Agent, or Firm* — Thomas | Horstemeyer, LLP

(57) ABSTRACT

A gripping device for gripping a binding material from an object comprises first and second elongated blades. The first and second elongated blades are arranged parallel and stationary in relation to each other, and they comprise wedge-shaped protrusions. The adjacent wedge-shaped protrusions of each elongated blades form spacing between said adjacent wedge-shaped protrusions. The device comprises also a third elongated blade arranged between said first and second elongated blades. The third elongated blade comprises finger like protrusions, and is arranged to move in relation to said first and second elongated blades in the direction of said longitudinal axis and between first and second positions. In the first position the finger like protrusions form openings and in the second position the finger like protrusions are deflected from the first position so to closing the openings.

12 Claims, 3 Drawing Sheets

(58) Field of Classification Search
USPC ....... 83/174.1; 414/24.5, 111, 721, 729, 741
See application file for complete search history.

(56) References Cited

U.S. PATENT DOCUMENTS

| | | | | |
|---|---|---|---|---|
| 4,850,087 | A * | 7/1989 | Gronau | B65B 69/0025 |
| | | | | 242/470 |
| 5,445,490 | A * | 8/1995 | Whitehead | B65B 69/0025 |
| | | | | 414/607 |
| 5,474,242 | A * | 12/1995 | Rafn | E04G 23/08 |
| | | | | 241/101.73 |
| 6,393,688 | B1 * | 5/2002 | Axner | B65B 69/0025 |
| | | | | 83/509 |
| 7,216,575 | B2 * | 5/2007 | Alseth | E04G 23/082 |
| | | | | 83/609 |
| 9,440,369 | B2 * | 9/2016 | Bayer | B26D 7/025 |
| 9,505,135 | B1 * | 11/2016 | Malstrom | B25J 15/0042 |
| 9,914,232 | B2 * | 3/2018 | Walker | B26D 3/26 |
| 10,632,640 | B2 * | 4/2020 | Bucks | B26D 1/36 |
| 10,647,463 | B2 * | 5/2020 | Steenhoek | A01D 87/127 |
| 10,863,677 | B2 * | 12/2020 | van Nus | A01F 29/08 |
| 10,899,488 | B2 * | 1/2021 | Kivelä | B65B 69/0025 |
| 10,980,185 | B2 * | 4/2021 | Hickey | A01F 29/005 |
| 11,465,303 | B2 * | 10/2022 | Stapelbroek | B26B 19/3893 |
| 11,523,563 | B2 * | 12/2022 | Smith | A01D 87/127 |
| 2008/0073922 | A1 * | 3/2008 | Holtz | B25J 15/0213 |
| | | | | 901/1 |
| 2008/0159830 | A1 * | 7/2008 | Haugstad | B65B 69/0033 |
| | | | | 414/412 |
| 2009/0019826 | A1 * | 1/2009 | Rigney | A01D 41/00 |
| | | | | 56/53 |
| 2009/0108606 | A1 * | 4/2009 | Noonan | A01D 87/127 |
| | | | | 294/104 |
| 2009/0202327 | A1 * | 8/2009 | Cory | B65B 69/0033 |
| | | | | 414/412 |
| 2010/0164243 | A1 * | 7/2010 | Albin | B66F 9/065 |
| | | | | 74/425 |
| 2011/0113941 | A1 * | 5/2011 | Norberg | B65B 69/0025 |
| | | | | 83/78 |
| 2011/0119929 | A1 * | 5/2011 | Lau | B26B 19/06 |
| | | | | 30/223 |
| 2014/0230619 | A1 * | 8/2014 | Bayer | B26D 7/1836 |
| | | | | 83/401 |
| 2016/0107249 | A1 * | 4/2016 | Cartwright | B23D 15/04 |
| | | | | 702/158 |
| 2016/0174520 | A1 * | 6/2016 | Liet | B26D 1/18 |
| | | | | 83/78 |
| 2017/0029155 | A1 * | 2/2017 | Kivela | D01G 7/06 |
| 2017/0072579 | A1 * | 3/2017 | Reis | A23L 19/18 |
| 2019/0085531 | A1 * | 3/2019 | Johnson | B23D 35/002 |
| 2020/0316793 | A1 * | 10/2020 | Phoon | B26B 19/063 |

* cited by examiner

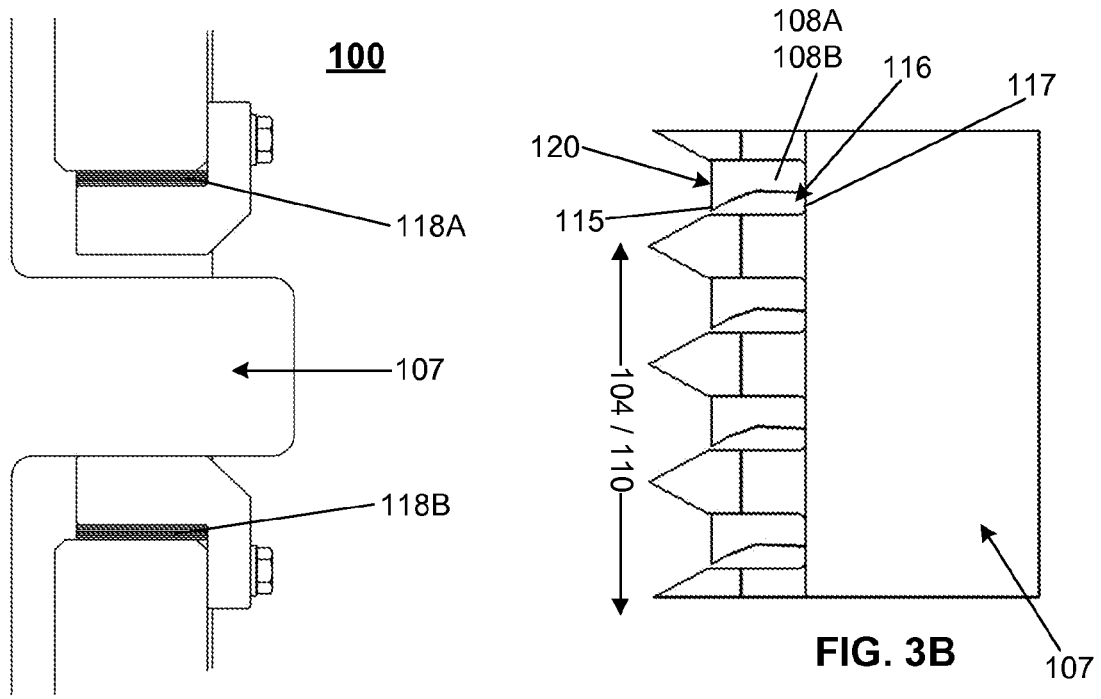
FIG. 3A
FIG. 3B
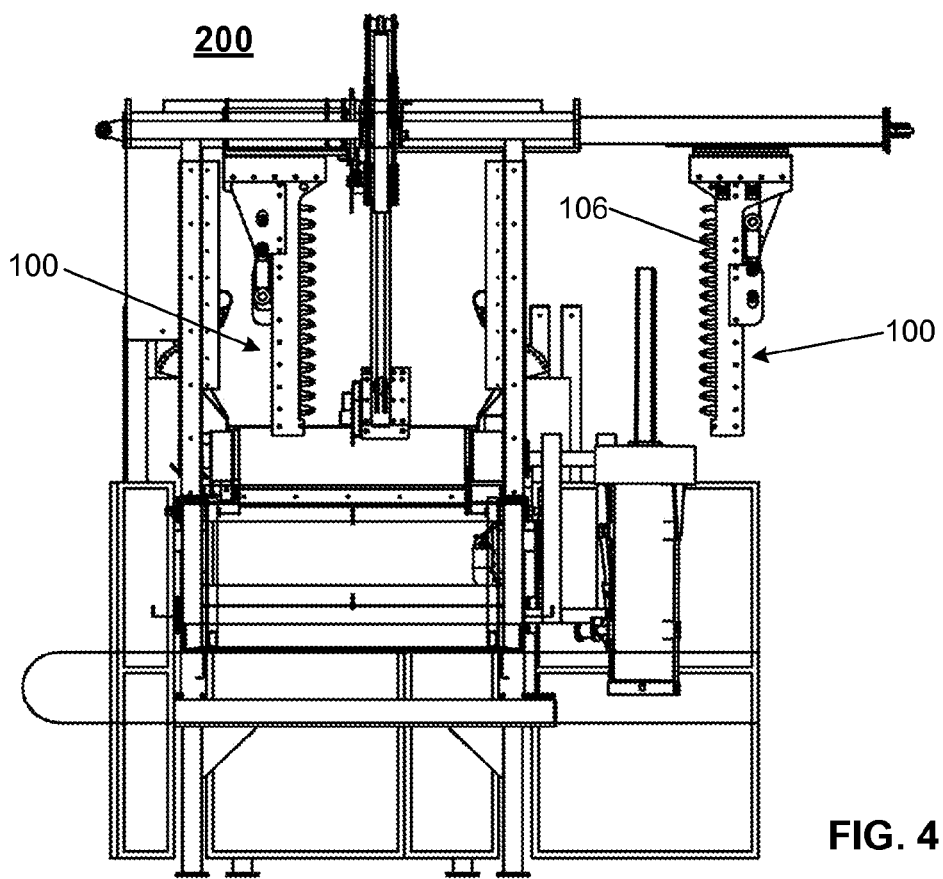
FIG. 4

GRIPPING DEVICE FOR GRIPPING A BINDING MATERIAL FROM AN OBJECT

CROSS-REFERENCE TO RELATED APPLICATIONS

This application is the 35 U.S.C. § 371 national stage application of PCT Application No. PCT/FI2018/050623, filed Sep. 4, 2018, where the PCT claims priority to, and the benefit of, Finnish Application no. 20175790, filed Sep. 5, 2017, both of which are herein incorporated by reference in their entireties.

TECHNICAL FIELD OF THE INVENTION

The invention relates to a gripping device for gripping a binding material, like wires, metal or plastic wires, straps, strings, bands or web-like material, from an object tied with said binding material. An example of such object is a bale, such as a compressible trash bale having plastic material, plastic bottles, pulp, paper and the like, for example.

BACKGROUND OF THE INVENTION

Many objects, such as bales, are bound e.g. by providing binding material around the object to be bound. The bale material may be any material suitable to be bound, such as for example chemical pulp or waste materials, like RDF, SRF (Refuse-derived fuel (RDF) or solid recovered fuel/specified recovered fuel (SRF)) and other waste, recyclable materials and industrial materials, in particularly compressible trash bale having plastic material, plastic bottles, pulp, paper and the like, for example. When the material is bound, it is easy to store or transfer to a further processing, such as waste bales e.g. to a combustion plant. Often there is a need to open the bound objects and remove the binding material for example before further processing, for example before further processing of the waste bale, such as recycling or combusting the waste material.

There are solutions for opening the bale or other object and e.g. for removing the binding material by a bale opener. Often the bale opener has a cutting means for cutting the binding material and gripping device, which grips and possibly cuts the binding material and removes it by pulling movement and after that typically pulls the wrapping or binding material from the object, such as from the bale.

There are however some disadvantages relating to the prior art gripping devices, such as sometimes it might be that the binding material sticks to the gripping device, such as between the moving blades of the gripping device, which causes inefficiency of the opening process of the object.

SUMMARY OF THE INVENTION

An object of the invention is to alleviate and eliminate the problems relating to the known prior art. Especially the object of the invention is to provide a gripping device for gripping and catching the binding material so that the binding material does not stick to the gripping device or between any parts of the gripping device.

The object of the invention can be achieved by the features of independent claims.

The invention relates to a device according to claim 1.

According to an embodiment of the invention a gripping device for gripping a binding material from an object comprises first and second elongated blades. The first and second elongated blades are arranged parallel to each other so to having a common longitudinal axis. In addition the first and second elongated blades are arranged stationary or immovable in relation to each other, such as fixed with bolts or welded, for example. Both of the first and second elongated blades comprise protrusions, advantageously fixed and immobile wedge-shaped protrusions, such as teeth. The wedge-shaped protrusions are arranged sequentially in leading edges of the blades and advantageously perpendicularly to the longitudinal axis and extending from the leading edge of the first and second elongated blades. The adjacent wedge-shaped protrusions of each elongated blades are arranged so to form spacing between each adjacent wedge-shaped protrusions.

In addition the device comprises a third elongated blade, which is arranged between the first and second elongated blades. The third elongated blade comprises finger like protrusions, which are arranged sequentially in a leading edge of the third blade and extending from the leading edge of the third blade into a direction to be introduced to the object during operation. The third elongated blade may have a wedge-shaped design so that the leading (or distal) edge (pointing outward or towards the object to be introduced) comprises a protrusion design and the rear (or proximal) edge has a design enabling a bigger space into the rear area of the mouth of the blade construction and thereby enabling binding material with different size to be introduced between the finger like protrusions.

The third elongated blade is arranged to move in relation to the first and second elongated blades in the direction of the longitudinal axis and between first and second positions. In the first position the finger like protrusions are configured to form openings, which are essentially at the same level and parallel with the spacing of the adjacent wedge-shaped protrusions. According to an example the finger like protrusions are essentially at the same level with the wedge-shaped protrusions of the first and second elongated blades in the first position. In the first position, or an open position, the binding material can be introduced to the openings and spacing.

In the second position the finger like protrusions are deflected from the first position so that the finger like protrusions essentially close the opening formed in the first position in order to catch and grip the binding material between the finger like protrusions and the wedge-shaped protrusions.

According to an embodiment the first elongated blade is made of a single piece of material, as well as also the second elongated blade is made of a single piece of material, or both of the first and second elongated blades are made of same single piece of material, and whereupon a suitable slot or groove for the third blade is arranged between the first and second elongated blades. Advantageously the leading edge of the first and second elongated blades are closed, either by manufacturing the slot or groove and other design so or by welding or closing it by other ways known by the skilled person, whereupon the structure is very durable. In addition the first and second elongated blades, e.g. if made from separate pieces, may be fixed together, such as bolted or welded so that the first and second elongated blades are immobile in relation to each other. In addition a space is provided between the first and second elongated blades for receiving the third blade into the space between first and second elongated blades. Thus advantageously the third blade is moved in relation to the first and second elongated blades, whereupon the sticking of the binding material between the wedge-shaped protrusions can be avoided. The sticking of the binding material would otherwise be a huge problem if the wedge-shaped protrusions were moving.

According to an embodiment also the wedge-shaped protrusions can be made of the same single piece of material than the corresponding first and second elongated blades. This fastens and makes the manufacturing process of the blades with the wedge-shaped protrusions very easy and effective. In addition the structure is very strong.

In an operation the wedge-shaped protrusions are penetrated at least partially into the object. During the penetration wedge-shaped protrusions guide the binding material into the openings of the device formed by the finger like protrusions together with said wedge-shaped protrusions. The binding material may e.g. to be guided along the surface of the wedge portion of said wedge-shaped protrusions.

According to an embodiment the finger like protrusions of the third elongated blade comprises a curved tip portion. The curved tip portion is arranged into a leading edge, or a nose portion, of the finger like protrusion. Advantageously the curved tip portion extends in a direction of the longitudinal axis and in a direction of the movement of said finger like protrusions from the first (open) position into the second (close) position. Advantageously the curved tip portion forms a gap between the curved tip portion and the leading edge of the third elongated blade thereby allowing capturing the binding material into the gap when the third elongated blade is moved in the second (closed) position. The gap is advantageously a small slot to which the binding material can be captured.

Advantageously the size of the gap or movement range of the third elongated blade can be adjusted to so to allowing different size binding material to be introduced to the gap and thereby caught and gripped by the finger like protrusions and the wedge-shaped protrusions. The adjustment of the gap size can be implemented e.g. by shim member, which limit the movement range of the third blade in relation to the first and second elongated blades in the direction of the longitudinal axis and between first and second positions so that at first the extent of the opening and/or the size of the gap is big enough in the first opening position, and in addition that especially the size of the gap is tight enough in the second (closed) position, thereby preventing any slip of the binding material when it is caught and pulled out from the object.

According to an example the curved tip portion may be arranged so that it locates in the first (open) position essentially at the same level of a first wedge-shaped protrusion and where the curved tip portion is moved into the second (closed) position, it locates essentially at the same level of a second wedge-shaped portion thereby closing said opening formed in said first position. In this the first and second wedge-shaped portions means the adjacent wedge-shaped portions.

The finger like protrusion can be arranged so that an inner surface (which points towards the formed opening or gap) comprises a curved concave form (at the outer end portion of the finger like protrusion or the curved tip portion), which thanks to its design squishes the binding material more tightly if the binding material tends to move outwards and away from the opening or gap during moving the third elongated blade from the first position to the second position and/or pulling out the device from the object.

Advantageously the third elongated blade comprises same number of the finger like protrusions than there are spacing formed between the adjacent wedge-shaped protrusions of the gripping device. Thus each opening is closed by the finger like protrusions of the third blade in the second (closed) position. The gripping device advantageously comprises a moving device, such as hydraulic or pneumatic cylinder, which is coupled with the third elongated blade. The moving device actuates the third elongated blade advantageously by one movement and thereby moves the finger like protrusions between the first and second positions.

The present invention offers advantages over the known prior art, such as a reliable gripping device, which is easy and fast to manufacture. In addition sticking of the binding material to the parts of the device can be effectively minimized due to stationary first and second elongated blades and only one moving third blade. Moreover the structure of the gripping device is very strong due to manufacturing method, where the first elongated blade as well as also the second elongated blade with the wedge-shaped protrusions are made from a single unit. Still in addition the adjustment of gap size offers clear advantage namely in this way different size of the binding materials can still be reliably gripped.

The exemplary embodiments presented in this text are not to be interpreted to pose limitations to the applicability of the appended claims. The verb "to comprise" is used in this text as an open limitation that does not exclude the existence of also unrecited features. The features recited in depending to claims are mutually freely combinable unless otherwise explicitly stated.

The novel features which are considered as characteristic of the invention are set forth in particular in the appended claims. The invention itself, however, both as to its construction and its method of operation, together with additional objects and advantages thereof, will be best understood from the following description of specific example embodiments when read in connection with the accompanying drawings.

BRIEF DESCRIPTION OF THE DRAWINGS

Next the invention will be described in greater detail with reference to exemplary embodiments in accordance with the accompanying drawings, in which:

FIGS. 3A-3B illustrate an example principle for adjusting a movement range of a third blade and size of a gap according to an advantageous embodiment of the invention, and FIG. 4 illustrate an example of a bale opener with the gripping device according to an advantageous embodiment of the invention.

DETAILED DESCRIPTION

Figure 1A:
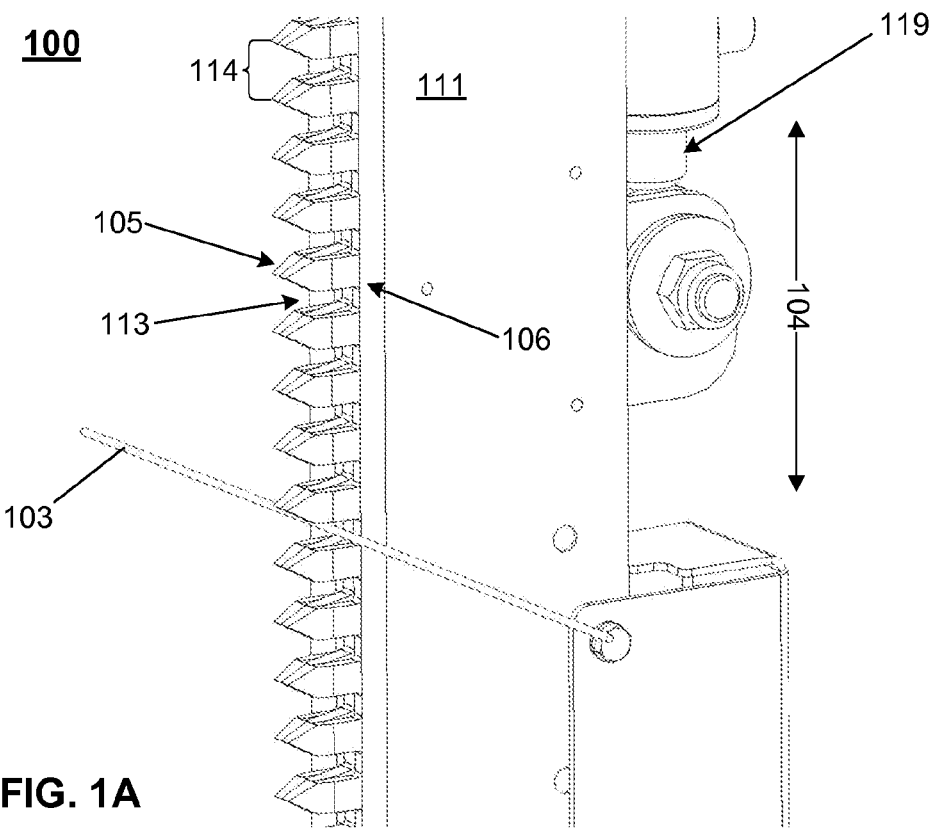
FIGS. 1A-1B illustrate a principle of an exemplary gripping device in a first open position according to an advantageous embodiment of the invention.
Figure 1B:
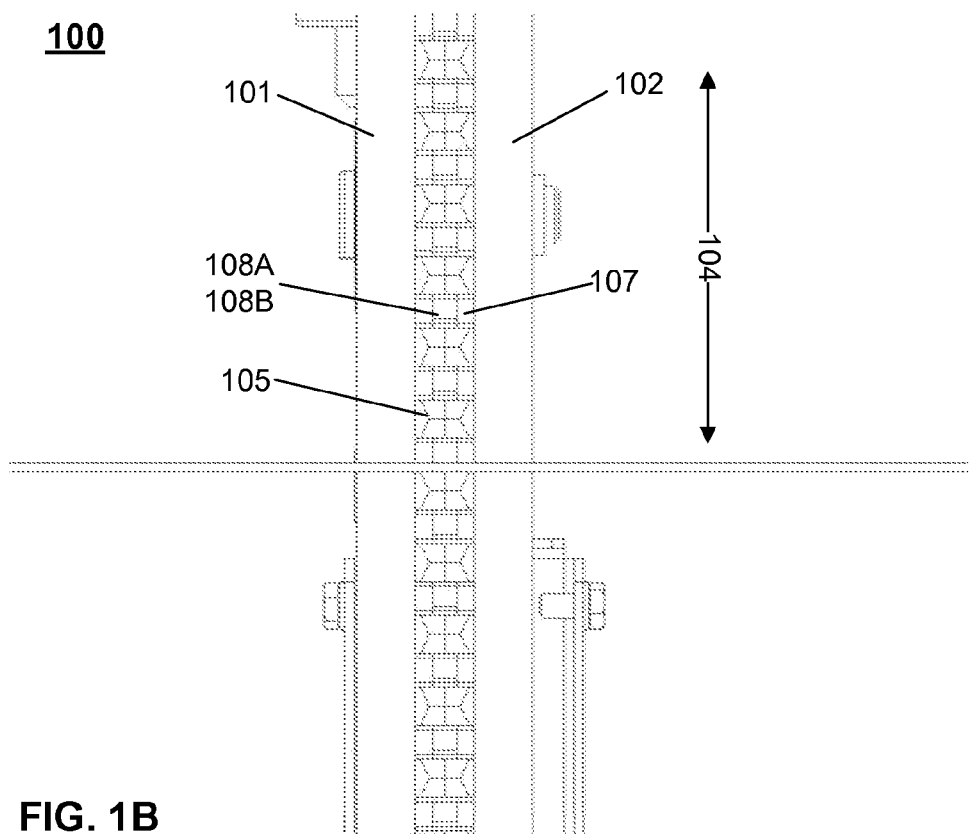
Figure 2A:
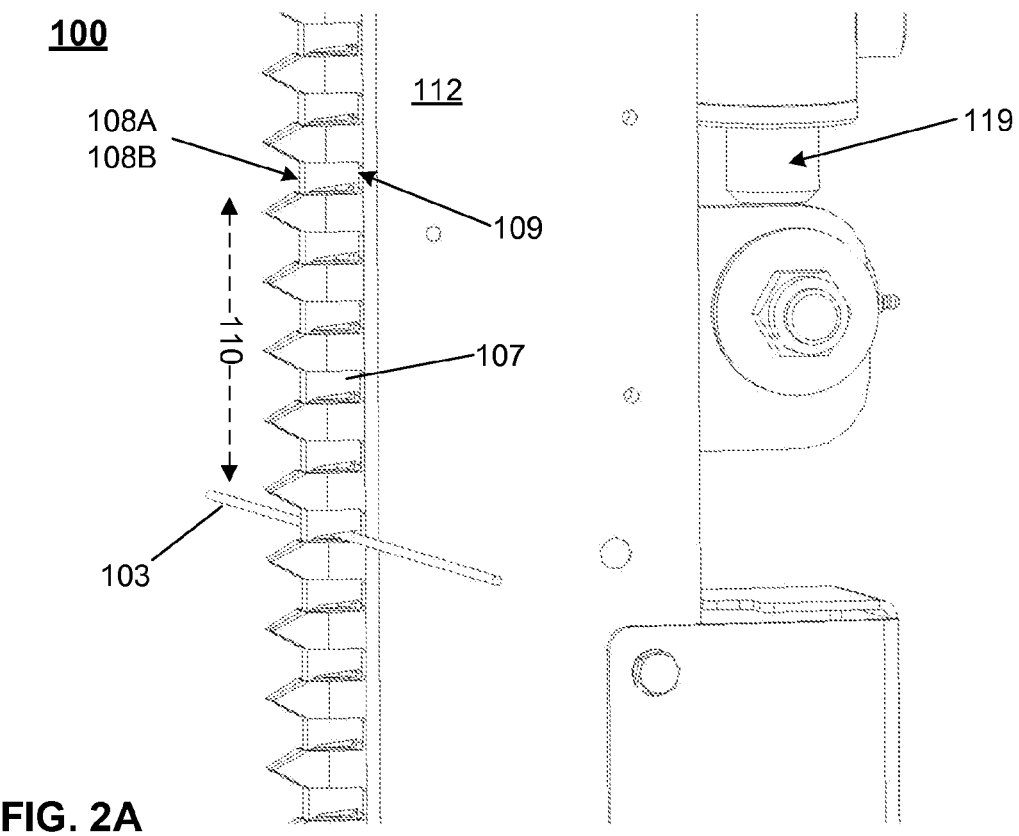
FIGS. 2A-2B illustrate a principle of an exemplary gripping device in a second closed position according to an advantageous embodiment of the invention.
Figure 2B:
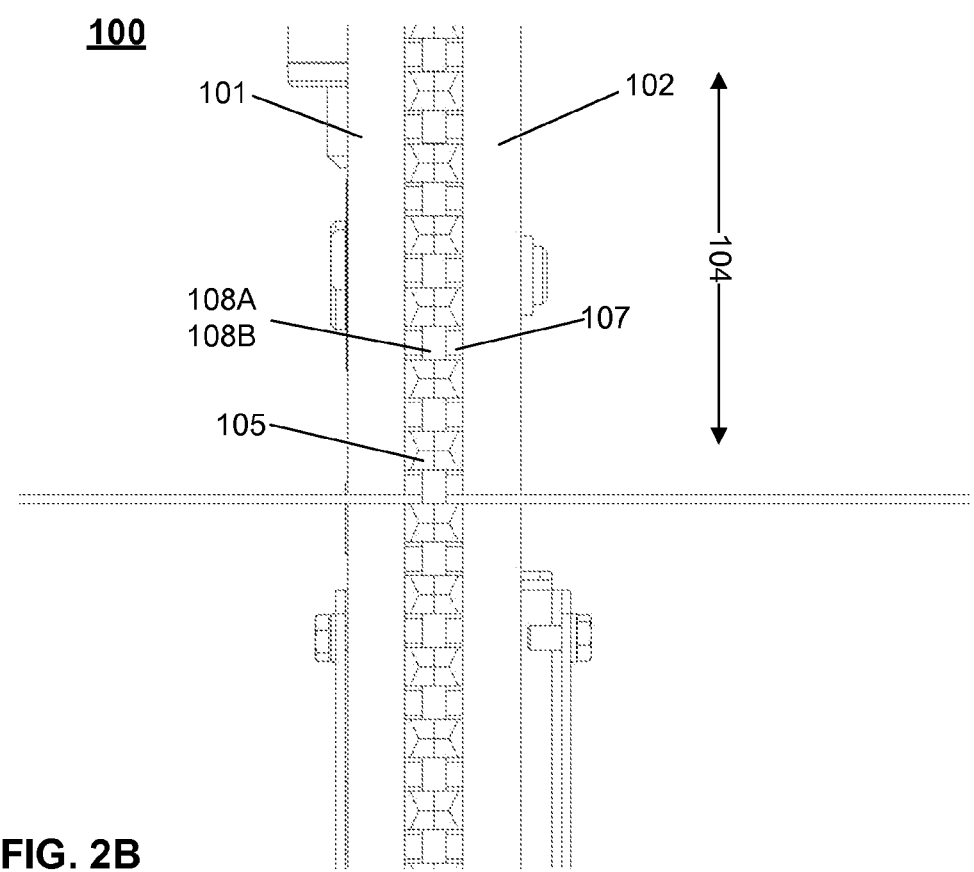

FIGS. 1A-1B illustrate a principle of an exemplary gripping device 100 in a first open position 111 according to an advantageous embodiment of the invention, and FIGS. 2A-2B illustrate a principle the gripping device in a second closed position 112 according to an advantageous embodiment of the invention.

The gripping device 100 comprises first and second elongated blades 101, 102, which are parallel to each other and have a common longitudinal axis 104. The first and second elongated blades 101, 102 comprise wedge-shaped protrusions 105, which are arranged sequentially in leading edges 106 of the blades and advantageously perpendicularly to the longitudinal axis 104 and extending from the leading edge 106. Spacing 114 are formed between each adjacent wedge-shaped protrusions 105.

A third elongated blade 107, which is arranged between the first and second elongated blades 101, 102, comprises finger like protrusions 108. The finger like protrusions 108 are arranged sequentially in a leading edge 109 of the third blade 107 and extending from the leading edge of the third blade into a direction to be introduced to the object during operation.

The third elongated blade 107 is arranged to move 110 in relation to the first and second elongated blades 101, 102 in the direction of the longitudinal axis 104 and between first and second positions 111, 112 (open and closed positions, as is described in FIGS. 1A-1B (open) and 2A-2B (closed)). In the first position 111 the finger like protrusions 108 form openings 113, which are essentially at the same level and parallel with the spacing 114 of the adjacent wedge-shaped protrusions 105, as can be seen in FIGS. 1A-1B. In the second position 112 the finger like protrusions 108 are deflected from the first position so that the finger like protrusions 108 essentially close the opening 113 formed in the first position 111 in order to catch and grip the binding material 103 between the finger like protrusions 108 and the wedge-shaped protrusions 105, as can be seen in FIGS. 2A-2B.

In addition the gripping device comprises also a moving device 119 for actuating the third elongated blade 107 and thereby moving the finger like protrusions 108 between the first and second positions 111, 112.

FIGS. 3A-3B illustrate an example principle for adjusting a movement range of a third blade 107 and adjusting also size of a gap 116 according to an advantageous embodiment of the invention. In addition it can be clearly seen that the finger like protrusions 108 of the third elongated blade 107 comprises a curved tip portion 115. The curved tip portion 115 is arranged into a leading edge 120, or a nose portion, of the finger like protrusion 108, extending in the direction of the longitudinal axis 104 and in a direction of the movement 110 of said finger like protrusions from the first (open) position into the second (close) position. Advantageously the curved tip portion 115 forms a gap 116 between the curved tip portion 115 and the leading edge 117 of the third elongated blade 107 thereby allowing capturing the binding material with different size into the gap 116 when the third elongated blade (107) is moved in the second (closed) position.

The gripping device 100 comprises shim members 118A, 118B, by which the movement range 110 in the direction of the longitudinal axis 104 of the third blade 107 and between first and second positions 111, 112, can be adjusted. As can be seen in FIG. 3A the first shim member 118A limits the range in opening direction so how big is the gap 116 in biggest so when the device is in the first (open) position 111 and the second shim member 118B limits the range in closing direction so how big is the gap 116 in smallest so when the device is in the second (closed) position 112.

However, it is to be noted that the movement range 110 of the third blade 107 can also be adjusted and controlled by a suitable controlling algorithm or computer with software. The device may comprise e.g. a sensor, such as a camera or the like, for determining the size of the binding material, whereupon the computer with the software can adjust the movement range 110 of the third blade 107 suitable for the binding material in question, based on the determined size of the binding material.

FIG. 4 illustrate an example of a bale opener 200 with the gripping device 100 according to an advantageous embodiment of the invention. The leading edges 106 of the blades are configured to be introduced to the object in operation so that the protrusions 105 penetrate into the object.

The invention has been explained above with reference to the aforementioned embodiments, and several advantages of the invention have been demonstrated. It is clear that the invention is not only restricted to these embodiments, but comprises all possible embodiments within the spirit and scope of the inventive thought and the following patent claims. In particularly it is to be noted that the binding material can be any binding material, such as for example wires, like metal or plastic wires, straps, strings, bands or web-like material, by which the object is tied. The object can be for example a bale, such as a compressible trash bale having plastic material, plastic bottles, pulp, paper and the like, for example.

The features recited in dependent claims are mutually freely combinable unless otherwise explicitly stated.

The invention claimed is:

1. A gripping device for gripping a binding material from an object, wherein the gripping device comprises:
   first and second elongated blades having a common longitudinal axis, where
      said first and second elongated blades are arranged parallel and stationary in relation to each other,
      both first and second elongated blades comprise wedge-shaped protrusions arranged sequentially in leading edges of said blades and extending from the leading edge of said first and second elongated blades, where the adjacent wedge-shaped protrusions of each elongated blades form a spacing between said adjacent wedge-shaped protrusions and wherein said leading edges of said blades are configured to be introduced to the object in operation,
   a third elongated blade arranged between said first and second elongated blades, wherein said third elongated blade comprises finger like protrusions arranged sequentially in a leading edge of said third blade and extending from the leading edge of said third blade,
   wherein
      both of the first and second elongated blades are made of same single piece of material, and a groove for the third blade is arranged between the first and second elongated blades and the leading edges of the first and second elongated blades are closed such that said leading edges are in contact with each other,
      said third elongated blade is arranged to move in relation to said first and second elongated blades in the direction of said longitudinal axis and between first and second positions so that
         in the first position the finger like protrusions are configured to form openings parallel to the spacing of the adjacent wedge-shaped protrusions in order to allowing introduction of said binding material into said openings, and
         in the second position the finger like protrusions are deflected from the first position so that the finger like protrusions essentially close the openings formed in said first position in order to catch and grip the binding material between the finger like protrusions and the wedge-shaped protrusions, and
      each of said finger like protrusions of said third elongated blade comprises a curved tip portion, wherein said curved tip portion is arranged into a leading edge of said finger like protrusion so to form a gap between the curved tip portion and the leading edge of the third elongated blade thereby allowing capturing the binding material into the gap without cutting the binding material when the third elongated blade is moved in the second position.

2. A gripping device of claim 1, wherein said wedge-shaped protrusions both of said first and second elongated blades are made of the same single piece of material as said corresponding first and second elongated blades.

3. A gripping device of claim 1, wherein said wedge-shaped protrusions are configured to be penetrated at least partially into the object, and during the penetration to guide the binding material into the openings of the device formed by the finger like protrusions together with said wedge-shaped protrusions.

4. A gripping device of claim 1, wherein the curved tip portion extends in a direction of said longitudinal axis and in a direction of the movement of said finger like protrusions from said first position into said second position.

5. A gripping device of claim 1, wherein the movement range and thus the size of the gap is arranged to be adjustable so to allowing different size binding material to be introduced to the opening and/or gap and caught and gripped by the finger like protrusions and the wedge-shaped protrusions.

6. A gripping device of claim 1, wherein the extent of the opening or the size of the gap is arranged to be adjusted by a shim member.

7. A gripping device of claim 1, wherein at least one curved tip portion is arranged so that it locates in said first position essentially at the same level of a first wedge-shaped protrusion and wherein said curved tip portion is arranged to move into said second position so that it locates in said second position essentially at the same level of a second wedge-shaped portion, where said first and second wedge-shaped portions are adjacent wedge-shaped portions, thereby closing said opening formed in said first position.

8. A gripping device of claim 1, wherein an inner surface of the finger like protrusion pointing towards the formed opening or gap comprises a curved concave form configured to squishing the binding material if the binding material tends to move outwards from the opening or gap during moving the third elongated blade from the first position to the second position.

9. A gripping device of claim 1, wherein the third elongated blade comprises same number of the finger like protrusions than there are spacing formed between the adjacent wedge-shaped protrusions of the gripping device.

10. A gripping device of claim 1, wherein the gripping device comprises a moving device coupled with said third elongated blade and configured to actuate said third elongated blade by a one movement and thereby move the finger like protrusions between said first and second positions.

11. A gripping device of claim 1, wherein said first and second elongated blades are fixed together so that said first and second elongated blades are immobile in relation to each other and wherein a space is provided between said first and second elongated blades for receiving said third blade.

12. A bale opener, wherein the bale opener comprises at least one gripping device for gripping a binding material from an object, wherein the gripping device comprises:
first and second elongated blades having a common longitudinal axis, where
said first and second elongated blades are arranged parallel and stationary in relation to each other,
both first and second elongated blades comprise wedge-shaped protrusions arranged sequentially in leading edges of said blades and extending from the leading edge of said first and second elongated blades, where the adjacent wedge-shaped protrusions of each elongated blades form a spacing between said adjacent wedge-shaped protrusions and wherein said leading edges of said blades are configured to be introduced to the object in operation,
a third elongated blade arranged between said first and second elongated blades, wherein said third elongated blade comprises finger like protrusions arranged sequentially in a leading edge of said third blade and extending from the leading edge of said third blade, wherein
both of the first and second elongated blades are made of same single piece of material, and a groove for the third blade is arranged between the first and second elongated blades and the leading edges of the first and second elongated blades are closed such that said leading edges are in contact with each other,
said third elongated blade is arranged to move in relation to said first and second elongated blades in the direction of said longitudinal axis and between first and second positions so that
in the first position the finger like protrusions are configured to form openings parallel to the spacing of the adjacent wedge-shaped protrusions in order to allowing introduction of said binding material into said openings, and
in the second position the finger like protrusions are deflected from the first position so that the finger like protrusions essentially close the openings formed in said first position in order to catch and grip the binding material between the finger like protrusions and the wedge-shaped protrusions, and
each of said finger like protrusions of said third elongated blade comprises a curved tip portion, wherein said curved tip portion is arranged into a leading edge of said finger like protrusion so to form a gap between the curved tip portion and the leading edge of the third elongated blade thereby allowing capturing the binding material into the gap without cutting the binding material when the third elongated blade is moved in the second position.

* * * * *

UNITED STATES PATENT AND TRADEMARK OFFICE
CERTIFICATE OF CORRECTION

| | | |
|---|---|---|
| PATENT NO. | : 11,827,404 B2 | Page 1 of 1 |
| APPLICATION NO. | : 16/644655 | |
| DATED | : November 28, 2023 | |
| INVENTOR(S) | : Paananen et al. | |

It is certified that error appears in the above-identified patent and that said Letters Patent is hereby corrected as shown below:

On the Title Page

Item (73)
Please change "Cool Wrap Oy, Siilinjarve (FI)" to --CROSS WRAP OY, Siilinjarve (FI)--

Signed and Sealed this
Eleventh Day of November, 2025

John A. Squires
*Director of the United States Patent and Trademark Office*